US012659515B2

(12) United States Patent
Cismas et al.

(10) Patent No.: US 12,659,515 B2
(45) Date of Patent: Jun. 16, 2026

(54) DASHBOARD FOR PROVIDING PER-FRAME TELEMETRY DATA

(71) Applicant: Apple Inc., Cupertino, CA (US)

(72) Inventors: Sorin C Cismas, Saratoga, CA (US); Alhad A Palkar, San Jose, CA (US); Kaushik Raghunath, Pleasanton, CA (US); Arun Kannan, Mountain View, CA (US); Manjunath M Venkatesh, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 199 days.

(21) Appl. No.: 18/510,413

(22) Filed: Nov. 15, 2023

(65) Prior Publication Data

US 2024/0403994 A1 Dec. 5, 2024

Related U.S. Application Data

(60) Provisional application No. 63/505,791, filed on Jun. 2, 2023.

(51) Int. Cl.
| | |
|---|---|
| *H04N 19/65* | (2014.01) |
| *G06T 1/20* | (2006.01) |
| *G06T 5/77* | (2024.01) |
| *H04L 65/80* | (2022.01) |
| *H04N 19/895* | (2014.01) |

(52) U.S. Cl.
CPC .............. *H04N 19/65* (2014.11); *G06T 1/20* (2013.01); *G06T 5/77* (2024.01); *H04L 65/80* (2013.01); *H04N 19/895* (2014.11)

(58) Field of Classification Search
CPC ........ H04N 19/65; H04N 19/895; G06T 1/20; G06T 5/77; H04L 65/80; G09G 2330/12; G09G 3/2033; G06F 3/147

USPC ................... 345/501; 705/2, 14.39; 715/234
See application file for complete search history.

(56) References Cited

U.S. PATENT DOCUMENTS

| | | | |
|---|---|---|---|
| 3,632,865 A | 1/1972 | Haskell et al. |
| 3,755,789 A | 8/1973 | Collins |
| 5,406,322 A | 4/1995 | Port et al. |
| 6,209,021 B1 | 3/2001 | Ahimovic et al. |
| 6,956,600 B1 | 10/2005 | Gaylord |
| 6,957,350 B1 | 10/2005 | Demos |
| 7,360,230 B1 | 4/2008 | Paz et al. |
| 7,548,653 B2 | 6/2009 | Olshansky et al. |
| 8,416,847 B2 | 4/2013 | Roman |
| 8,896,668 B2 | 11/2014 | Goma et al. |
| 9,185,386 B2 | 11/2015 | Ozawa et al. |

(Continued)

FOREIGN PATENT DOCUMENTS

| | | | |
|---|---|---|---|
| WO | 2019105932 A1 | 6/2019 |
| WO | 2023283184 A1 | 1/2023 |

OTHER PUBLICATIONS

International Search Report and Written Opinion, for PCT Application No. PCT/US2024/029146 dated Sep. 9, 2024; 11 pgs.

*Primary Examiner* — Prabodh M Dharia
(74) *Attorney, Agent, or Firm* — Fletcher Yoder, P.C.

(57) ABSTRACT

First integrated circuitry including image data rendering circuitry configured to generate image data and memory configured to store a dashboard including dashboard entries indicating a state of the image data to the image data rendering circuitry, wherein the image data rendering circuitry is configured to operate based at least in part on feedback from the dashboard.

19 Claims, 6 Drawing Sheets

(56)  References Cited

U.S. PATENT DOCUMENTS

| | | | |
|---|---|---|---|
| 9,438,881 B2 | 9/2016 | Leontaris et al. | |
| 9,986,220 B2 | 5/2018 | Newton et al. | |
| 10,275,880 B2 | 4/2019 | Barnes et al. | |
| 10,536,666 B1 | 1/2020 | Robertson et al. | |
| 11,127,110 B2* | 9/2021 | Bratt | G06F 3/012 |
| 2001/0020981 A1 | 9/2001 | Jun et al. | |
| 2004/0080482 A1 | 4/2004 | Magendanz et al. | |
| 2004/0131249 A1 | 7/2004 | Sandrew | |
| 2004/0179591 A1 | 9/2004 | Wenger et al. | |
| 2005/0084006 A1 | 4/2005 | Lei et al. | |
| 2005/0089102 A1 | 4/2005 | Alvarez Arevalo et al. | |
| 2009/0147133 A1 | 6/2009 | Wei et al. | |
| 2010/0037283 A1 | 2/2010 | Zhu | |
| 2010/0039447 A1 | 2/2010 | Nakao | |
| 2011/0126159 A1 | 5/2011 | Ko et al. | |
| 2011/0148919 A1 | 6/2011 | Heggelund et al. | |
| 2011/0228848 A1 | 9/2011 | Dvir et al. | |
| 2011/0271307 A1 | 11/2011 | Post et al. | |
| 2012/0089902 A1* | 4/2012 | Sheflin | H04L 67/02 |
| | | | 715/234 |
| 2012/0106921 A1 | 5/2012 | Sasaki et al. | |
| 2012/0239661 A1* | 9/2012 | Giblin | G06F 3/0482 |
| | | | 707/E17.031 |
| 2012/0253918 A1* | 10/2012 | Marois | G06Q 30/02 |
| | | | 705/14.39 |
| 2013/0083160 A1 | 4/2013 | Ballocca et al. | |
| 2013/0110537 A1* | 5/2013 | Smith | G06Q 10/10 |
| | | | 705/2 |
| 2014/0074805 A1 | 3/2014 | Kapoor et al. | |
| 2014/0092096 A1* | 4/2014 | Breedvelt-Schouten | |
| | | | G06F 40/143 |
| | | | 345/441 |
| 2014/0307734 A1 | 10/2014 | Luby et al. | |
| 2015/0228101 A1 | 8/2015 | Shuster et al. | |
| 2015/0373402 A1 | 12/2015 | Zimmeri et al. | |
| 2016/0127740 A1 | 5/2016 | Chen et al. | |
| 2016/0163014 A1 | 6/2016 | Yang et al. | |
| 2016/0227228 A1 | 8/2016 | Pomeroy et al. | |
| 2016/0275905 A1 | 9/2016 | Sacchetto et al. | |
| 2017/0078653 A1 | 3/2017 | Bi et al. | |
| 2017/0139874 A1 | 5/2017 | Chin | |
| 2017/0280126 A1 | 9/2017 | Auwera et al. | |
| 2018/0211395 A1 | 7/2018 | King et al. | |
| 2019/0110274 A1* | 4/2019 | Buono | H04N 21/25816 |
| 2019/0272616 A1 | 9/2019 | Lee et al. | |
| 2019/0364205 A1 | 11/2019 | Wozniak et al. | |
| 2020/0081517 A1* | 3/2020 | Holland | G06F 1/3287 |
| 2020/0133696 A1 | 4/2020 | Zimmermann et al. | |
| 2020/0302692 A1 | 9/2020 | Li et al. | |
| 2020/0351341 A1 | 11/2020 | Illowsky et al. | |
| 2021/0065712 A1* | 3/2021 | Holm | G10L 15/02 |
| 2021/0146222 A1* | 5/2021 | Putnam | H04W 4/38 |
| 2021/0224959 A1 | 7/2021 | Oh et al. | |
| 2021/0351867 A1* | 11/2021 | Babkin | H04L 65/65 |
| 2022/0337799 A1* | 10/2022 | Chen | G06T 15/005 |
| 2023/0096567 A1 | 3/2023 | Nalci et al. | |
| 2023/0199255 A1* | 6/2023 | Sanford | H04N 21/4627 |
| | | | 725/25 |
| 2023/0275950 A1* | 8/2023 | Sundareson | H04N 19/59 |

* cited by examiner

DASHBOARD FOR PROVIDING PER-FRAME TELEMETRY DATA

CROSS-REFERENCE TO RELATED APPLICATIONS

This application claims priority to U.S. Provisional Application No. 63/505,791, filed Jun. 2, 2023, entitled "Systems and Methods for Error Concealment of Missing Image Data," the disclosure of which is incorporated by reference in its entirety.

BACKGROUND

The present disclosure relates generally to image processing and, more particularly, to concealing or communicating errors in images due to missing image data.

Electronic devices often use one or more electronic displays to present visual representations of information (e.g., text, still images, video) based on corresponding image data. For example, such electronic devices may include computers, mobile phones, portable media devices, virtual-reality headsets, and vehicle dashboards, among many others. To display an image, an electronic display may receive image data to display to a viewer. At times, however, image data may be dropped. This could occur for a variety of reasons, such as transmission failure, rendering failure, excess latency in the hardware fabric providing the streaming image data, and so on. Under these conditions, the image data may not include all expected information (e.g., a partial image frame or an image frame with a hole may be received by the electronic display). While waiting for the expected image data to arrive, the electronic display could appear to hang to the viewer. Therefore, visual artifacts may appear in the electronic display, which may affect the user experience.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

This disclosure provides systems and methods for performing error concealment in the presentation of image data to a user via an electronic device. The electronic device may include streaming encoding or decoding circuitry that may receive the image data in a tile format from a sending electronic device. Further, the streaming encoding or decoding circuitry of the electronic device may expect a certain number of tiles per frame. Information provided to the electronic device via the streaming encoding or decoding circuitry may indicate that a tile from the image data is missing or incomplete. Thus, before being displayed, the tile that is missing or incomplete may be replaced with a glyph or a placeholder by the electronic device. Alternatively, the tile that is missing or incomplete may be replaced by repeating a number of previous frames.

Additionally, the electronic device may include a dashboard, which may include information related to the image data received by the electronic device. For example, the dashboard may provide per-frame telemetry to enable a compositor of the producing device to adjust the manner in which the image data is generated (e.g., starting rendering earlier or later, using different processing parameters such as resolution). The electronic device may receive feedback related to the received image data from the dashboard and/or provide feedback to the sending electronic device to enable the sending electronic device to aid in identifying the missing or incomplete image data.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figures 1, 2:
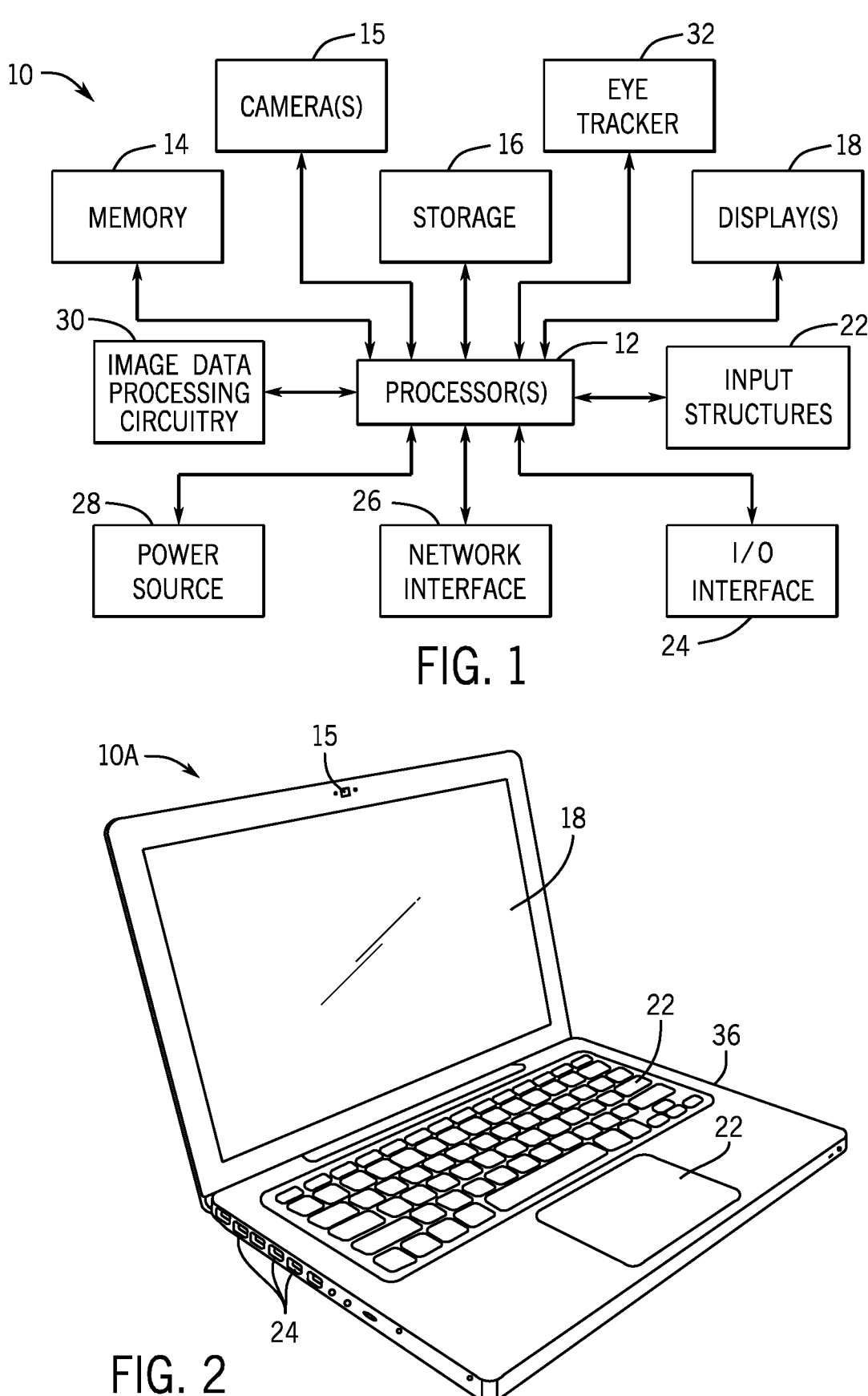
FIG. 1 is a block diagram of an electronic device that includes an electronic display, in accordance with an embodiment.
FIG. 2 is an example of the electronic device of FIG. 1 in the form of a notebook computer, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

The present disclosure relates to error concealment in the presentation of image data to a user via an electronic device. That is, using streaming encoding or decoding circuitry, the electronic device (e.g., a consumer or a first integrated circuit) may receive the image data in a tile format from a sending electronic device (e.g., a producer or a second integrated circuit). The receiving electronic device may expect a certain number of tiles per frame. The streaming encoding or decoding circuitry may provide information to the receiving electronic device indicating that a tile of the expected number of tiles is incomplete (e.g., partial or missing image data). As such, the receiving electronic device may receive the image data in a tile format and may replace the missing image data (e.g., replace a pixel or a tile) with a glyph or a placeholder. In some embodiments, the receiving electronic device or the sending electronic device may replace missing image data by repeating a number of previous frames.

Further, the receiving electronic device may include a dashboard that may include information related to a stream status of the image data. The receiving electronic device and/or the sending electronic device may receive feedback in real-time from the dashboard related to the stream status of the image data. The dashboard may include a frame identification (ID), a stream ID, and a timestamp. In an embodiment, the dashboard may provide information to the sending device relating to the missing image data. In this manner, the sending device may aid in identifying errors and missing image data.

With the foregoing in mind, FIG. 1 illustrates an electronic device 10 according to an embodiment of the present disclosure that may include, among other things, one or more processor(s) 12, memory 14, nonvolatile storage 16, one or more cameras 15, and one or more display(s) 18. Additionally, the electronic device 10 may include input structures 22, an input/output (I/O) interface 24, a network interface 26, a power source 28, image data processing circuitry 30, and an eye tracker 32. The various functional blocks shown in FIG. 1 may include hardware elements (including circuitry), software elements (including computer code stored on a computer-readable medium), or a combination of both hardware and software elements. It should be noted that FIG. 1 is merely one example of a particular implementation and is intended to illustrate the types of components that may be present in electronic device 10.

Figure 4:
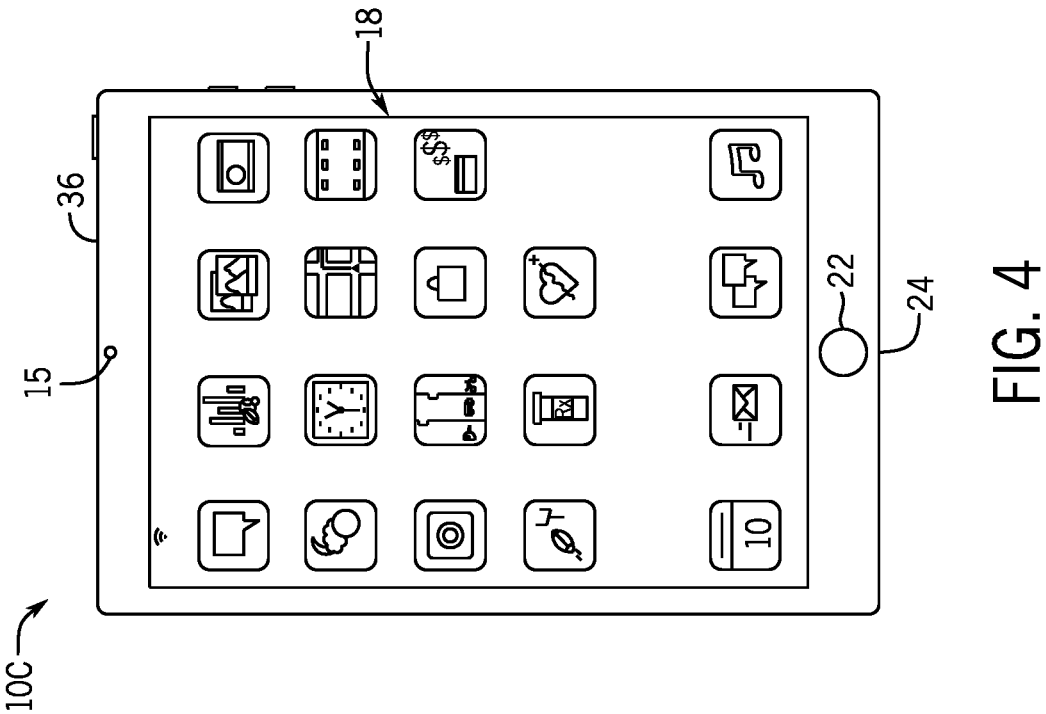
FIG. 4 is another example of the electronic device of FIG. 1 in the form of a handheld device, in accordance with an embodiment.
Figure 3:
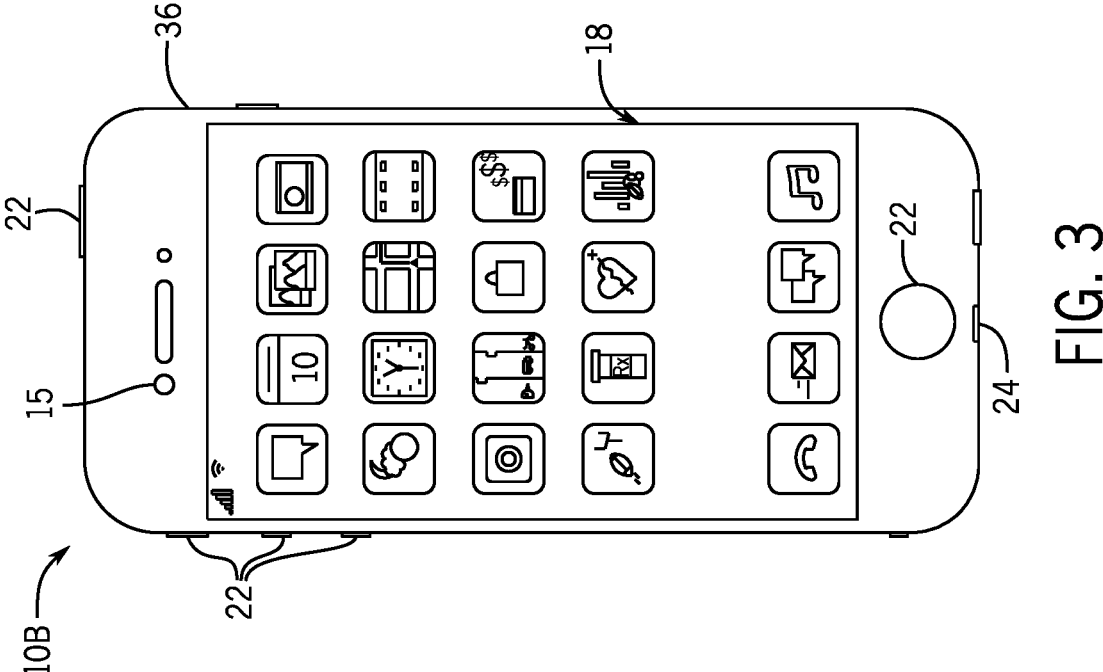
FIG. 3 is another example of the electronic device of FIG. 1 in the form of a handheld device, in accordance with an embodiment.
Figures 5, 6:
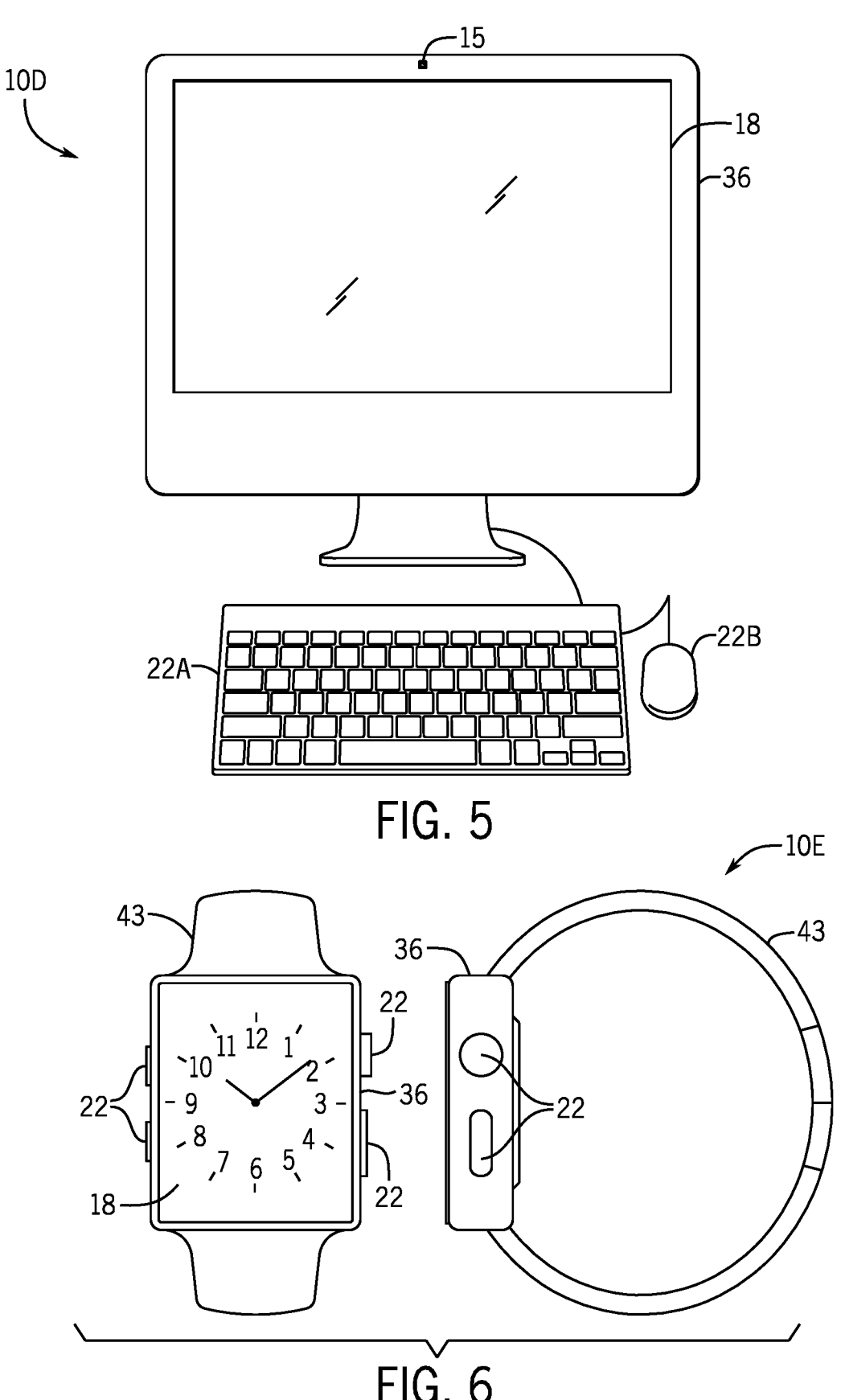
FIG. 5 is another example of the electronic device of FIG. 1 in the form of a desktop computer, in accordance with an embodiment.
FIG. 6 is another example of the electronic device of FIG. 1 in the form of a wearable electronic device, in accordance with an embodiment.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or partially as software and/or hardware. Moreover, the image data processing circuitry 30 (e.g., a graphics processing unit, a display image processing pipeline) may be included in the processor(s) 12 or be implemented separately. The processor(s) 12 and other related items in FIG. 1 may be a single contained processing module or may be incorporated wholly or partially within any of the other elements within the electronic device 10. In general, it should be noted that the various depicted components may be combined into fewer components or separated into additional components. For example, the memory 14 and the nonvolatile storage 16 may be included in a single component. Indeed, the nonvolatile storage 16 may include nonvolatile random-access memory.

In the electronic device 10 of FIG. 1, the processor(s) 12 may be operably coupled with a memory 14 and a nonvolatile storage 16 to perform various algorithms. For example, algorithms or instructions (e.g., software) for generating and/or transmitting image data from the one or more cameras 15 of one or more sources. Such algorithms or instructions executed by the processor(s) 12 may be stored in any suitable article of manufacture that includes one or more tangible, computer-readable media. For example, the tangible, computer-readable media may include the memory 14 and/or the nonvolatile storage 16, individually or collectively, to store the algorithms or instructions. In particular, the memory 14 and the nonvolatile storage 16 may include any suitable articles of manufacture for storing data and executable instructions, such as random-access memory (RAM), read-only memory (ROM), rewritable flash memory, hard drives, and optical discs. In addition, programs (e.g., an operating system) encoded on such a computer program product may also include instructions that may be executed by the processor(s) 12 to enable the electronic device 10 to provide various functionalities. The processor(s) 12 may include one or more general purpose microprocessors, one or more application specific integrated circuits (ASICs) and/or one or more field programmable gate arrays (FPGAs).

The display(s) 18 may represent any suitable electronic display(s). As previously discussed, the display(s) 18 may represent multiple displays that may display image data corresponding to a left eye and a right eye that is perceived as a single frame, for example, for an extended reality entertainment system. Image data may represent data that is used to generate an image that may appear on the display(s) 18, which may include matting data, graphics data, video data, camera data, metadata, and/or other types of data. In some embodiments, the display(s) 18 may include one or more light-emitting diode (LED) displays, organic light-emitting diode (OLED) displays, micro-LED (µLED) displays, or some combination of these and/or other display technologies. The display(s) 18 may also include a self-emissive pixel array having an array of one or more of self-emissive pixels. In such embodiments, the display(s) 18 may include any suitable circuitry to drive the self-emissive pixels, such as display drivers like row drivers and/or column drivers. Each of the self-emissive pixels may include any suitable light emitting element, such as an LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used.

Additionally, the display(s) 18 may control light emission from the display pixels to present visual representations of information based on image data corresponding to the visual representations of information. For example, the display(s) 18 may present graphics including a graphical user interface (GUI) of an operating system, an application interface, a still image, video content, or the like, by displaying frames based at least in part on image data. In particular, the display(s) 18 may be operably coupled to the processor(s) 12 and the image data processing circuitry 30 so that the display(s) 18 may display frames based on the image data generated by the processor(s) 12, the image data processing circuitry 30, or the like. As will be described herein, the display(s) 18 may receive the frames of image data via the network interface 26, the input structures 22, and/or the I/O interface 24, for example, captured by the one or more cameras 15.

Furthermore, the display(s) 18 may be foveated display(s) such that different portions of the display(s) 18 are displayed at different resolutions (depending on the viewer's gaze). A warp block may consider the resolution at different portions of the display(s) 18 when determining mapping between the image data and warped image data.

The image data processing circuitry 30 may be implemented in the electronic device 10, in the display(s) 18, or a combination thereof. For example, the image data processing circuitry 30 may be included in the processor(s) 12, a timing controller (TCON) in the display(s) 18, or any combination thereof. As should be appreciated, although image processing is discussed herein as being performed via a number of image data processing blocks, embodiments may include hardware or software components to carry out the techniques discussed herein. The processor(s) 12 may change configuration of the image data processing circuitry 30, such as to use or not use certain image processing blocks, based on the task to be implemented.

The input structures 22 of the electronic device 10 may enable a user to interact with the electronic device 10 (e.g., pressing a button to increase or decrease a volume level). In some embodiments, the input structures 22 may include touch-sensing components in the display(s) 18. The touch sensing components may receive user inputs by detecting occurrence and/or position of an object touching the surface of the display(s) 18.

The I/O interface 24 may enable the electronic device 10 to interface with various other electronic devices, as may the network interface 26, such as to receive the image data. The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a 3$^{rd}$ generation (3G) cellular network, universal mobile telecommunication system (UMTS), 4$^{th}$ generation (4G) cellular network, long term evolution (LTE®) cellular network, long term evolution license assisted access (LTE-LAA) cellular network, 5$^{th}$ generation (5G) cellular network, and/or New Radio (NR) cellular network. In particular, the network interface 26 may include, for example, one or more interfaces for using a Release-15 cellular communication standard of the 5G specifications that include the millimeter wave (mmWave) frequency range (e.g., 30-300 GHz).

In some embodiments, a transceiver of the electronic device 10 may allow communication over the aforementioned networks (e.g., 5G, Wi-Fi, LTE-LAA, and so forth). The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

The power source 28 may provide electrical power to one or more components in the electronic device 10, such as the processor(s) 12 and/or the display(s) 18. Thus, the power source 28 may include any suitable source of energy, such as a rechargeable lithium polymer (Li-poly) battery and/or an alternating current (AC) power converter. The power source 28 may use distribution rails and/or additional smaller power sources within the electronic device 10 to aid in supplying power to the one or more components.

The eye tracker 32 may measure positions and movement of one or both eyes of someone viewing the display(s) 18 of the electronic device 10. For instance, the eye tracker 32 may include a camera that can record the movement of a viewer's eyes as the viewer looks at the display(s) 18. However, several different practices may be employed to track a viewer's eye movements. For example, different types of infrared/near infrared eye tracking techniques such as bright-pupil tracking and dark-pupil tracking may be used. In both of these types of eye tracking, infrared or near infrared light is reflected off of one or both of the eyes of the viewer to create corneal reflections. A vector between the center of the pupil of the eye and the corneal reflections may be used to determine a point on the display(s) 18 at which the viewer is looking. The processor(s) 12 may use the gaze angle(s) of the eyes of the viewer when generating image data for display on the display(s) 18.

In certain embodiments, the electronic device 10 may take the form of a computer, a portable electronic device, a wearable electronic device, or other type of electronic device. Such computers may be generally portable (such as laptop, notebook, and tablet computers), or generally used in one place (such as desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, California. By way of example, the electronic device 10, taking the form of a notebook computer 10A, is illustrated in FIG. 2 in accordance with one embodiment of the present disclosure. The depicted notebook computer 10A may include a housing or enclosure 36, one or more cameras 15, a display(s) 18, input structures 22, and ports of an I/O interface 24. In one embodiment, the input structures 22 (such as a keyboard and/or touchpad) may be used to interact with the notebook computer 10A, such as to start, control, or operate a graphical user interface (GUI) and/or applications running on notebook computer 10A. For example, a keyboard and/or touchpad may allow a user to navigate a user interface and/or an application interface displayed on display(s) 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPhone® available from Apple Inc. of Cupertino, California. The handheld device 10B may include a camera 15 and an enclosure 36 to protect interior components from physical damage and/or to shield them from electromagnetic interference. The enclosure 36 may surround the display(s) 18. The I/O interfaces 24 may open through the enclosure 36 and may include, for example, an I/O port for a hardwired connection for charging and/or content manipulation using a standard connector and protocol, such as the Lightning connector provided by Apple Inc. of Cupertino, California, a universal serial bus (USB), or other similar connector and protocol.

The input structures 22, in combination with the display(s) 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control or may toggle between vibrate and ring modes. The input structures 22 may also include a microphone that may obtain a user's voice for various voice-related features and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a Mac-Book®, or other similar device by Apple Inc. of Cupertino, California. It should be noted that the computer 10D may also represent a personal computer (PC) by another manufacturer. A similar enclosure 36 may be provided to protect and enclose internal components of the computer 10D, such as the camera 15 and the display(s) 18. In certain embodiments, a user of the computer 10D may interact with the computer 10D using various peripheral input structures 22, such as the keyboard 22A or mouse 22B (e.g., input structures 22), which may connect to the computer 10D.

As described above, the display(s) 18 may display images based at least in part on image data. Before being used to display a corresponding image on the display(s) 18, the image data may be processed, for example, via the image data processing circuitry 30. In general, the image data processing circuitry 30 may process the image data for display on the display(s) 18. For example, the image data processing circuitry 30 may include a display pipeline, memory-to-memory scaler, and rotator (MSR) circuitry, warp compensation circuitry, or additional hardware or software means for processing image data. The image data may be processed by the image data processing circuitry 30 to reduce or eliminate image artifacts, compensate for one or more different software or hardware related effects, and/or format the image data for display on the display(s) 18. As should be appreciated, the present techniques may be implemented in standalone circuitry, software, and/or firmware, and may be considered a part of, separate from, and/or parallel with a display pipeline or MSR circuitry.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. of Cupertino, California. However, in other embodiments, the wearable electronic device 10E may include any wearable electronic device such as, for example, a wearable exercise monitoring device (e.g., pedometer, accelerometer, heart rate monitor), or another device by another manufacturer. The display(s) 18 of the wearable electronic device 10E may include a touch screen display 18 (e.g., LCD, LED display, OLED display, active-matrix organic light emitting diode (AMO-LED) display, and so forth), as well as input structures 22, which may allow users to interact with a user interface of the wearable electronic device 10E.

Figure 7:
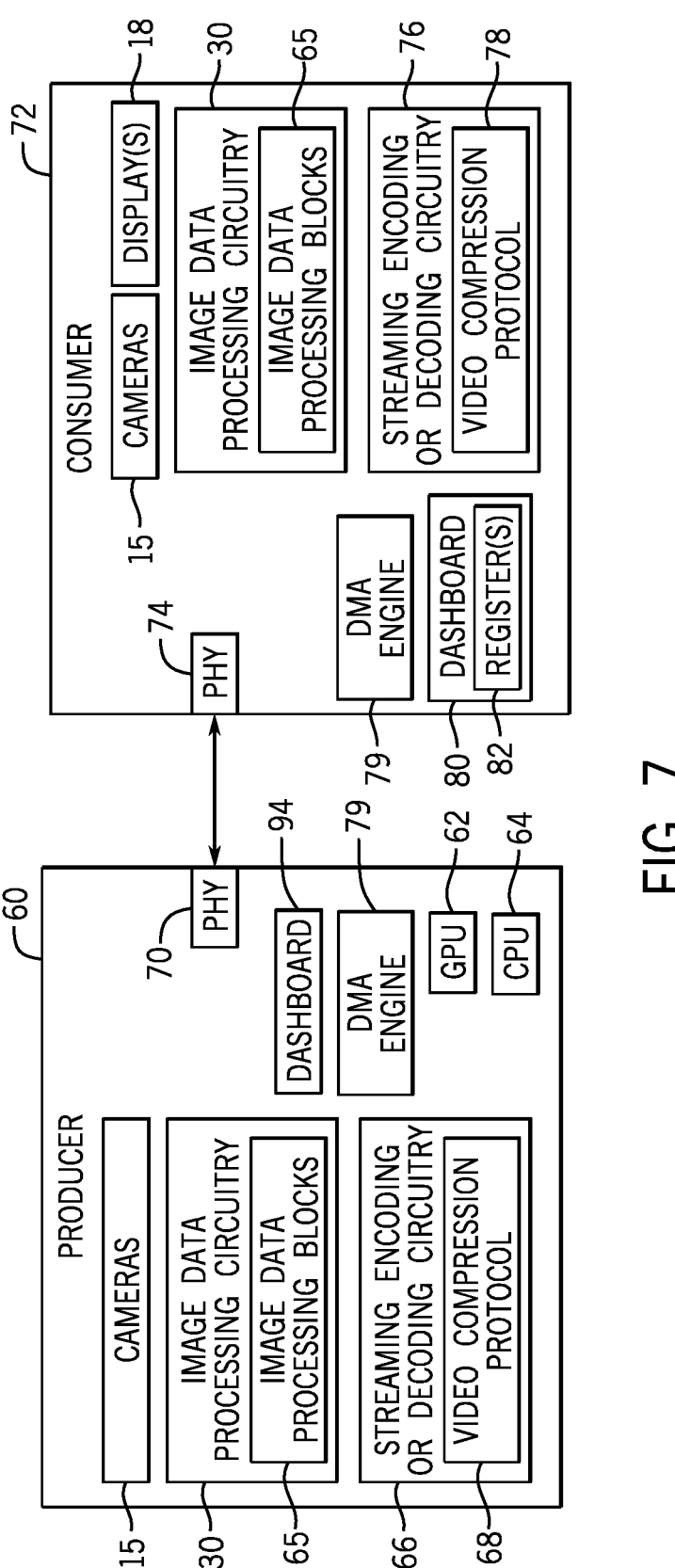
FIG. 7 is a block diagram of production and consumption of image data using error concealment, in accordance with an embodiment.

FIG. 7 illustrates the production and consumption of image data (e.g., video data, streaming image data) using error concealment. As shown, a producer 60 (e.g., an electronic device 10 and/or integrated circuitry) may produce the image data and/or capture part of the image data. Specifically, the producer 60 may operate as an image source that generates image data based on software running on the producer 60. The producer 60 may receive image data captured from cameras connected to another device, such as a consumer 72, but may also include one or more cameras 15 that capture image data. The producer 60 may include a graphics processor unit (GPU) 62 or a central processing unit (CPU) 64 that render the captured image data or additional image data to be overlaid or combined with the captured image data. In some examples, the GPU 62 may render the image data based on instructions from the CPU 64, which may generate most or all of the metadata. Additionally, the producer 60 may include the image data processing circuitry 30, which may include one or more image data processing blocks 65 (e.g., display pipeline circuitry, modules, or processing stages). For example, the one or more image data processing blocks 65 may include a pixel contrast control (PCC) block, a burn-in compensation (BIC)/ burn-in statistics (BIS) block, a color management block, a dither block, a blend block, a warp block, and/or a scaling/ rotation block. The GPU 62, CPU 64, and/or the image processing circuitry 30 may be individually or collectively referred to as a "compositor," "rendering engine," or "image data rendering circuitry." Indeed, in some cases, the "compositor," "rendering engine," or "image data rendering circuitry" may represent software running on the CPU 64 that coordinates streams of data to be provided to the consumer 72. For example, frames of image data may be generated and provided along with multiple different streams of corresponding data (e.g., video data, graphics mesh data, camera mesh data, matting mesh data, and/or other types of data).

Further, the producer 60 may include streaming encoding or decoding circuitry 66 (e.g., streaming codec circuitry), which may implement a video compression protocol 68 (e.g., Apple Professional Quality Intermediate Codec, a ProRES codec). The video compression protocol 68 may be used in a streaming mode. Further, the video compression protocol 68 may be implemented and shared by some or all encoding and/or decoding streams. The producer 60 may send the image data, via physical layer circuitry (PHY) 70, to a consumer 72 (e.g., another electronic device 10 and/or another integrated circuitry) having corresponding physical layer circuitry (PHY) 74. The PHY 70 and 74 may correspond to circuitry to enable any suitable manner of communicating data (e.g., wired, wireless, optical). Indeed, the producer 60 and the consumer 72 may communicate using one or more interfaces or protocols such as Low Power Display Port (LPDP) links (e.g., via corresponding LPDP RX/TX circuitry). The LPDP links may be tunneled over a wired communication protocol (e.g., Universal Serial Bus (USB) 2, USB 3, USB 4, and so on). In some embodiments, the image data may be communicated between the producer 60 and the consumer 72 via a wireless link. It should be noted that although communication between the producer 60 and the consumer 72 is discussed as using USB and LPDP links over a wired connection, any suitable communication methods, protocols, and/or standards may be used.

The consumer 72 may also include streaming encoding or decoding circuitry 76 (e.g., a streaming codec), which may include a video compression protocol 78, a direct memory access (DMA) engine 79, the image data processing circuitry 30, the one or more displays 18, and the one or more cameras 15. The streaming encoding or decoding circuitry 66 of the producer 60 may receive or transmit image data (e.g., video data), and may aid in encoding or decoding the image data. The streaming encoding or decoding circuitry 66 may read multiple camera streams, multiple metadata streams, multiple audio sample streams, and any other suitable streams. The image data or other suitable data from the streaming encoding or decoding circuitry 66 may be organized into frames, and the frames may be split into tiles or any other suitable division of the frame.

Additionally, the streaming encoding or decoding circuitry 66 may compress audio data, image data, and/or video data for streaming via the video compression protocol 68. The video compression protocol 68 may operate in a full duplex mode. In an embodiment, the streaming encoding or decoding circuitry 66 may split the image data into multiple horizontal strips (e.g., 64 lines) referred to as tiles that may cover only part of or may cover the full width of the frame. The horizontal strips may be compressed by the video compression protocol 68 to reduce bandwidth. Moreover, the streaming encoding or decoding circuitry 66 may multiplex the image data with other image data. In an embodiment, the streaming encoding or decoding circuitry 66 may implement a single PHY 70 channel to stream data. Each stream may contain frames of data that are transported from the producer 60 directly to the consumer 72.

The producer 60 may send, via the streaming encoding or decoding circuitry 66 and the PHY 70, the image data for processing to the consumer 72. Data such as video frames (image data), audio frames, or any other suitable type of data may be communicated between the producer 60 and the consumer 72 via the PHY 70 and the PHY 74.

As disclosed herein, the producer 60 may send the data, including the image data, for processing to the consumer 72. The data may include image data, video data, graphics mesh data, camera mesh data, matting mesh data, and/or other types of data. In some embodiments, the other types of data may include non-video, non-image related data for a non-video, or non-image related environment. The data may be based on application usage, data parameters associated with the application, and/or device type (e.g., configuration files for the consumer 72).

The streaming encoding or decoding circuitry 76 of the consumer 72 may also receive or transmit the image data, and help with encoding or decoding the image data. The streaming encoding or decoding circuitry 76 may demultiplex the image data, decompress the image data, and/or write the image data to the memory 14 for displaying the image data on the display(s) 18. Moreover, the streaming encoding or decoding circuitry 76 may write the graphics data, matting data, mesh parameters, transforms data (e.g., warped space to lens space), and metadata to the memory 14. The matting data may indicate an alpha matte and foreground associated with the image data, such as a video sequence, to facilitate blending graphics and camera video to generate a final output. The mesh parameters may enable a three-dimensional (3D) reconstruction and effects, for example, for video data to create a virtual reality on the entertainment system. The metadata may include camera settings and state for the one or more cameras 15, timestamps, settings and state of auxiliary devices, statistics computed by the one or more cameras 15, and/or statistics computed by an image signal processor (ISP). In some embodiments, the streaming encoding or decoding circuitry 76 may include an end-to-end full duplex streaming operation. Moreover, the streaming encoding or decoding circuitry 76 may read multiple streams of image data produced by multiple producers with a system on a chip.

Additionally, the streaming encoding or decoding circuitry 76 may implement error concealment if error concealment is enabled for the incoming image data (e.g., the streaming data). Indeed, where one or more frames are missing (e.g., data is missing or was not received), the streaming encoding or decoding circuitry 76 may either repeat the last frame or insert a fixed programmable glyph in place of the missing data. Additional detail with regard to the error concealment capabilities of the streaming encoding or decoding circuitry 76 will be discussed below with reference to FIGS. 8 and 9.

The consumer 72 and/or the producer 60 may also include a DMA engine 79. The DMA engine 79 may include a companion DMA. The DMA engine 79 may enable the consumer 72 and/or the producer 60 to communicate data and/or space available. Further, the graphics data and the matting data may use the companion DMA, while other types of data may not. The companion DMA may support both linear modes (e.g., compressed or uncompressed) or tiled modes, including both of these in some cases. In some embodiments, the companion DMA may support frame overlap, which allows the producer 60 to start processing the next frame while the consumer 72 is reading the current frame.

The consumer 72 may include a dashboard 80. Additionally or alternatively, the producer 60 may include a dashboard 94. The consumer 72 may perform an update to the dashboard 80 relating to the received image data. For example, firmware (e.g., software embedded in the hardware of the consumer 72) may update the dashboard 80. The update may be sent after a full frame (e.g., the streaming encoding or decoding circuitry 66 has output the full frame) is received or after a partial frame (e.g., the streaming encoding or decoding circuitry 66 has output a tile) is received. Further, the consumer 72 may render the data at the display(s) 18, which may be associated with the electronic device 10, and/or another electronic device that is different from the electronic device 10. A variety of per-frame telemetry data may be provided in the dashboard 80. For example, a dedicated dashboard entry may be allocated for each transmit and receive stream of the image data. Additionally, the dashboard 80 may provide an indication (e.g., with an 8-byte status) of the stream status via the dedicated dashboard entry of the stream. The firmware may communicate the stream status to the consumer 72 and, in some embodiments, to the producer 60. As an example, the metadata may be received by the display(s) 18 (e.g., of the consumer 72), and the firmware of the display(s) 18 may determine which frame to use next based on a message received by the dashboard 80.

Additionally, the producer 60 may communicate data availability to the consumer 72 using the dashboard 80 in the streaming encoding or decoding circuitry 76 address space. That is, each stream (e.g., the image data) transmitted by the producer 60 may write a buffer identification (ID) (e.g., byte) to the dedicated dashboard entry of the stream. Each of the dedicated dashboard entries may include one or more bit values of register(s) 82. For example, the register(s) 82 may include a bit-value (e.g., 64 bits) register and a bit-status (e.g., 64 bits) register. In an embodiment, the bit-value register and the bit-status register may be adjacent in an address space. Further, the bit-value register and the bit-status register may be byte aligned, for example, 16-byte-aligned. Additional detail regarding the dashboard 80 will be discussed below with reference to FIG. 8.

In some embodiments, the consumer 72 may capture some image data via the one or more cameras 15 and process the image data via the streaming encoding or decoding circuitry 76. Further, the consumer 72 may send the processed image data to the producer 60 via the PHY 74. That is, the electronic devices 10 and/or the integrated circuitry that produce the image data, process the image data, and display the image data, may each receive and/or transport the respective image data. Indeed, in some cases, each of the producer 60 and the consumer 72 may perform error concealment on the erroneous image data that is received from one another or from another source (e.g., a third image capture device, image data streamed from the Internet).

Figure 8:
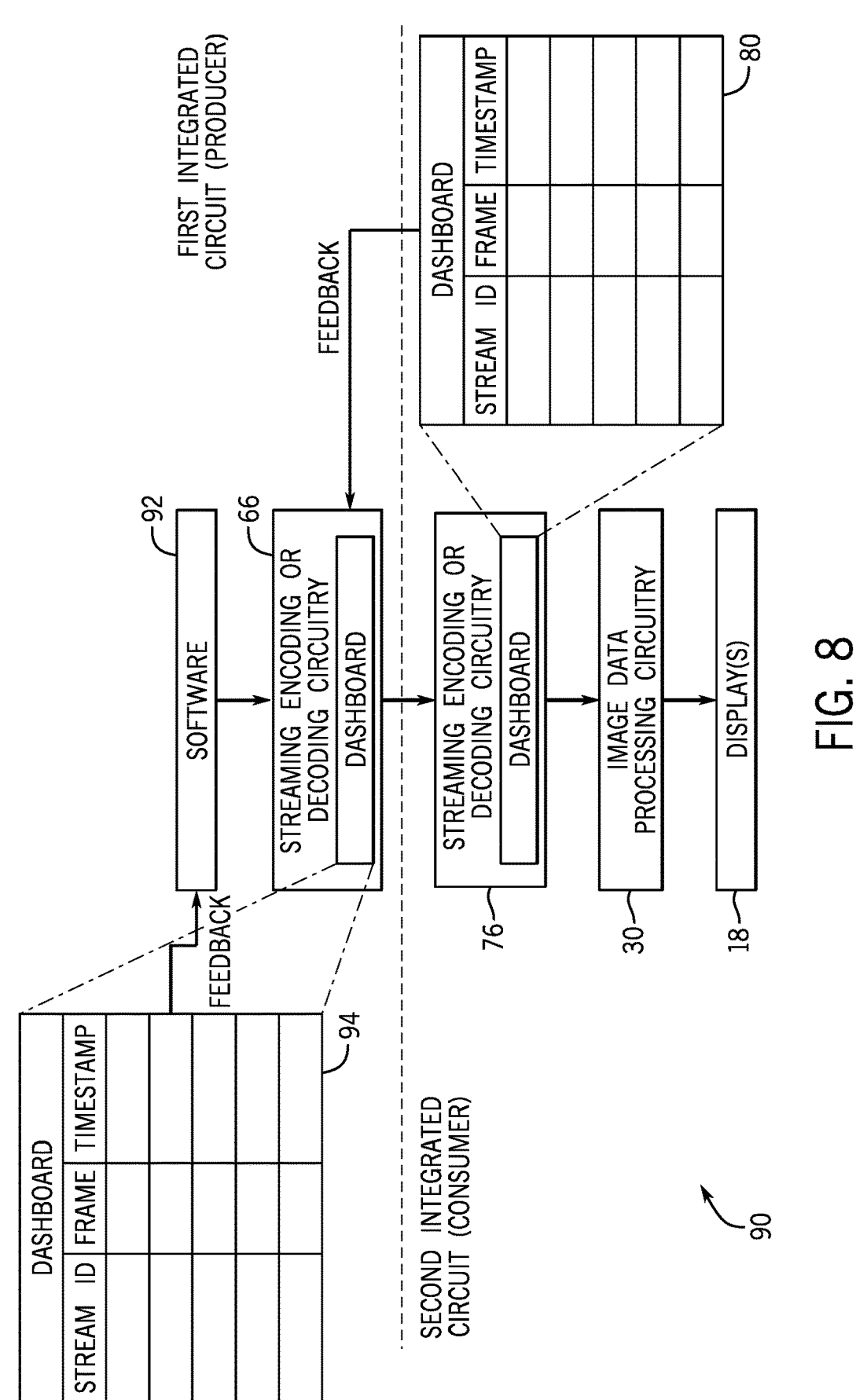
FIG. 8 is a block diagram illustrating transportation of data between a first integrated circuit and a second integrated circuit, in accordance with an embodiment.

FIG. 8 is a block diagram illustrating transportation 90 of data (e.g., image data, audio data, or video data) between a first integrated circuit (e.g., the producer 60) and a second integrated circuit (e.g., the consumer 72). It should be noted that each of the first integrated circuit and the second integrated circuit may be included on a single integrated circuit package, or may each be respectively integrated on a separate integrated circuit packages. In other words, the producer 60 and the consumer 72 may be separate devices or may be components of a single device. As shown, the transportation 90 may include software 92, the streaming encoding or decoding circuitry 66, the streaming encoding or decoding circuitry 76, the image data processing circuitry 30, and the display(s) 18.

The software 92 (e.g., running on the GPU 62 and/or CPU 64) may render the data to the streaming encoding or decoding circuitry 66. For example, the software 92 may generate or control or oversee the generation of image data with support from an image source, such as the GPU 62, the CPU 64, or one or more image sensors (e.g., the one or more cameras of the producer 60 and/or the consumer 72). The image data may be rendered as a sequence of digital frames. Each frame may include a grid of pixels and each pixel may be represented by a color value.

The image data may include graphics image data (e.g., stored or generated digital image), captured image data (e.g., a video image taken by the one or more cameras 15), and/or other image data such as matting image data generated to represent alpha values for an image blending process. In an embodiment, the image data may be rendered in tiled sections. Tiles may have any suitable dimensions. For example, tiles may be rectangular (square or not) groupings of pixel values of the image data and may be of any suitable size (e.g., 2×2, 4×4, 16×16, 32×32, and so on) depending on the implementation.

In some embodiments, the first integrated circuit (e.g., by the firmware on the GPU 62) may write a message to a dashboard 94 indicating valid image data is available after it has been rendered (e.g., after a stream of the image data has been rendered). The indication of the valid image data availability may include the availability and timing of each frame of the rendered image data within a stream or sequence. For example, the message may indicate the GPU 64 has finished rendering a primary video frame. Further, the first integrated circuit may communicate buffer data valid by writing (e.g., updating) a per-stream dedicated entry in the dashboard 94. To signal the frame data or buffer availability, the first integrated circuit may write a message to the dashboard 94 corresponding to the stream of the image data. In some embodiments, the first integrated circuit may determine whether to restart a frame based on which streams are available or unavailable (e.g., not available). For example, if metadata used for configuration is missing, the first integrated circuit may continue to proceed with transmission. However, if image data is missing, then the first integrated circuit may restart the frame.

The dashboard 94 may include the stream ID, the frame, and the timestamp. The dashboard 94 may be updated with information related to the stream ID, the frame, and the timestamp as the image data is generated or provided to the streaming encoding or decoding circuitry 66. Further, feedback from the dashboard 94 may be transmitted to the software 92 to enable the software 92 to adjust its operation based on the information in the dashboard 94. For example, the software 92 may repeat one or more frames based on the information in the dashboard 94 if rendering of the image data by the GPU 62 is late. Depending on which stream ID is late, the software 92 may repeat all or part of the one or more frames (e.g., graphics, matting, metadata, meshes, and gaze dependent compensation for left and right cameras) to the streaming encoding or decoding circuitry 66.

The streaming encoding or decoding circuitry 66 may receive the image data as a sequence of frames. The streaming encoding or decoding circuitry 66 may read multiple data streams, compress streams with the video compression protocol 68 (e.g., ProRES), perform packetization, multiplex the data streams, and encrypt the data streams. Moreover, the streaming encoding or decoding circuitry 66 may encode the data streams in line. That is, the streaming encoding or decoding circuitry 66 may encode the data streams and subsequently transmit each the data streams to the streaming encoding or decoding circuitry 76. The data streams may be processed in line and sent to the streaming encoding or decoding circuitry 76, without being sent to the memory 14. As such, because the data streams are encoded by the streaming encoding or decoding circuitry 66 and sent directly to the streaming encoding or decoding circuitry 76, power consumption and latency may be reduced.

In some embodiments, the streaming encoding or decoding circuitry 66 may be configured to operate using frame descriptors. The frame descriptors may define an individual frame or a circular buffer of frames. Further, the frame descriptors may describe the configuration parameters used to enable transmission and reception of the individual frame or, for circular buffer streams, for a circular buffer of frames. In addition, the frame descriptors may specify a source, a destination, frame height, frame width, offsets, and so on.

The streaming encoding or decoding circuitry 66 may include the image data organized into frames, which may be split into sub-frames. Further, transmission and reception of the frames may be triggered at regular intervals by sync-triggered streams (e.g., using a lead sync generator (sometimes referred to as a master sync generator (MSG)) synchronization signal) or by packet-triggered streams (e.g., based on data availability of the DMA engine or the dashboard). Stream packets may be transmitted to the streaming encoding or decoding circuitry 76 according to the stream's priority. In an embodiment, the frame order of the image data may be transmitted in a raster scan order, where data on top will be sent earlier than data on the bottom. The streaming encoding or decoding circuitry 66 may multiplex the image data with other data and may transport the frames via the wired communication standard (e.g., USB4) or the wireless link to the streaming encoding or decoding circuitry 76.

The streaming encoding or decoding circuitry 76 (e.g., the streaming encoding or decoding circuitry 76 of the consumer 72) may receive the frames transmitted by the streaming encoding or decoding circuitry 66. The streaming encoding or decoding circuitry 76 may demultiplex the image data, decompress the image data, and write back to the memory 14. Further, the streaming encoding or decoding circuitry 76 may include the dashboard 80. The dashboard 80 may include a table and may be memory-mapped into the structure of the streaming encoding or decoding circuitry 76. As illustrated, the dashboard 80 may include a dedicated dashboard entry, which may include a stream identification (ID), a frame, a timestamp, or any other suitable information related to the image data.

As described herein, the dedicated dashboard entry may include the bit-value register and the bit-status register (e.g., the register(s) 82). The bit-value register may include the stream ID (e.g., 8 bytes). The bit-status register may include the timestamp (e.g., 54 bits), a dropped bit, a new bit, and one or more reserved bits for future expansion. In this manner, the first integrated circuit and/or the second integrated circuit may identify the location of missing image data (e.g., a missing tile, a missing image frame). The first integrated circuit (e.g., the producer 60) may write the stream ID for the corresponding image data to update the dashboard 80 and inform the second integrated circuit (e.g., the consumer 72) the image data is ready.

Moreover, the second integrated circuit may transmit feedback (e.g., data including the stream ID, the frame, and the timestamp) from the dashboard 80 to the first integrated circuit. Thus, the first integrated circuit and/or the second integrated circuit may read the feedback and determine whether the image data is erroneous or missing. In some embodiments, the first integrated circuit may use the feedback from the dashboard 80 to determine adjustments to timing the sending of the image data, adjusting the grouping of the image data, or adjusting when to start processing or how to processing image frames (e.g., using the GPU 62 and/or CPU 64) to provide enough time to be fully processed (e.g., without dropped tiles) while still maintaining an acceptably low latency (e.g., fast enough that image data based on the cameras 15 appears to the viewer to be presented in real time with the real world). Further, the dashboard 80 may enable the first integrated circuit to determine whether and/or which image data may be transmitted or re-transmitted and how the image data may be grouped together for transmission. Additionally or alternatively, the dashboard 80 may provide information related to which image frame may be missing and thus may be repeated.

For the sync-triggered streams sent by the first integrated circuit to the second integrated circuit, if not all data has been received on time, an interrupt may be asserted by the streaming encoding or decoding circuitry 76 of the second integrated circuit. For example, the rendering of the image data by the software 92 may be late, and thus frames may be missing. Determining the image data is missing and/or erroneous may be based on determining whether the image data is missing one or more partial (e.g., tile) or full frames (e.g., an expected number of frames did not arrive). In addition, information regarding whether the image data is erroneous may be read via the dashboard 80 by the first integrated circuit and/or the second integrated circuit.

In some embodiments, error concealment may be implemented by the streaming encoding or decoding circuitry 76 to conceal the missing data by either repeating the previous one or more frames (which may include the graphics data, the matting data, the metadata, the meshes data, and/or gaze-dependent compensation data) that may be missing or replacing the missing one or more frames with a glyph. In an embodiment, the one or more frames may be repeated by using previous frame descriptors for transmission. In yet another embodiment, referring to the streaming encoding or decoding circuitry 76 (e.g., of the consumer 72), the lead sync generator synchronization signal may pulse but the sync-triggered stream may be unavailable. Thus, the second integrated circuit may perform the error concealment by either repeating a last pixel (e.g., a sample), repeating image data from a previous frame, or by implementing the placeholder value (e.g., the glyph value) as a constant.

The streaming encoding or decoding circuitry 76 may then transport the error-concealed image data to the image data processing circuitry 30, which may include the display pipeline. The image data processing circuitry 30 may process the image data to reduce or eliminate image artifacts, compensate for one or more different software or hardware related effects, and/or format the image data for display on the display(s) 18. In addition, the image data may be transported to the display(s) 18 for displaying.

Figure 9:
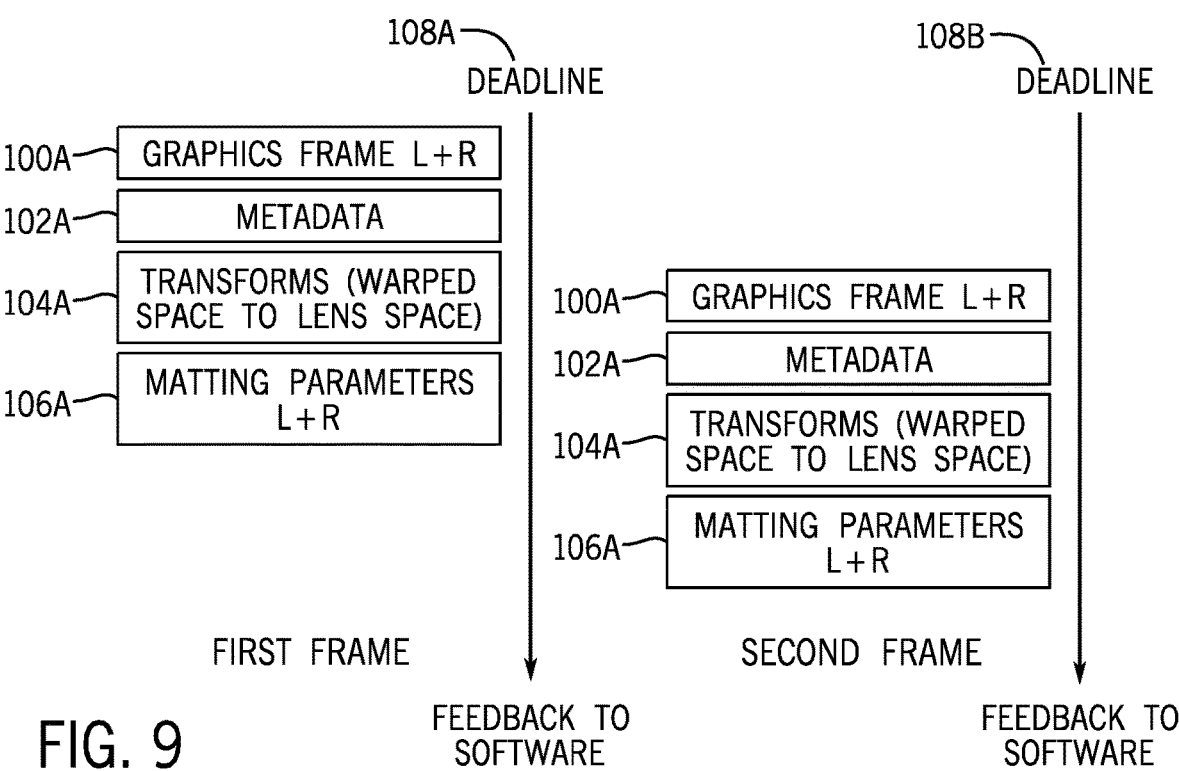
FIG. 9 is an illustration of the grouping of the data for transmission to the second integrated circuit, in accordance with an embodiment.

FIG. 9 is an illustration of the grouping of the data by the first integrated circuit for transmission to the second integrated circuit, in accordance with an embodiment. For example, as illustrated, the data may include a first frame and a second frame, which may each include graphics data 100A and 100B (from left and right camera(s)), metadata 102A and 102B, transforms 104A and 104B (e.g., warped space to lens space), and matting parameters 106A and 106B (from left and right camera(s)). It should be noted that although the graphics data 100, the metadata 102, the transforms 104, and the matting parameters 106 are illustrated, additional types of data may be included in the data for transmission to the second integrated circuit.

As shown in FIG. 9, the data of the first frame may be prepared prior to a deadline 108A and ready for transmission to the second integrated circuit. Moreover, the dashboard 94 may provide information of when each of the data (e.g., the graphics data 100A, the metadata 102A, the transforms 104A, and the matting parameters 106A) is ready to be transmitted to the streaming encoding or decoding circuitry 66 and/or the software 92. Therefore, for the first frame, the dashboard 94 may provide information indicating each of the data is ready before the deadline 108A. Additionally, because each of the data is prepared before the deadline 108A, the streaming encoding or decoding circuitry 66 may group each of the data together for direct transmission to the streaming encoding or decoding circuitry 76.

The data (e.g., the graphics data 100B, the metadata 102B, the transforms 104B, and the matting parameters 106B), of the second frame may then be prepared for transmission. The second frame may also have a deadline 108B for transmitting the data. However, as illustrated, the transforms 104B may not be prepared prior to the deadline 108B. Thus, the dashboard 94 may provide information indicating the transforms will not be ready prior to the deadline and error concealment may be implemented by the streaming encoding or decoding circuitry 66. That is, the streaming encoding or decoding circuitry 66 may perform error concealment by repeating previously sent data that had been prepared prior to the deadline (e.g., the last related data sent in full). For example, the streaming encoding or decoding circuitry 66 may repeat the previously sent transforms 104A of the first frame to error conceal the transforms 104B of the second frame unable to be rendered prior to the deadline 108B.

In an embodiment, the deadline 108 may be set at pre-defined times. The dashboard 94 may include read registers, which are read at each of the predefined times. The streaming encoding or decoding circuitry 66 may then use the information to determine whether to perform the error concealment. In another embodiment, the software 92 may enable determination and/or implementation of the performance of error concealment when transmitting the data from the first integrated circuit to the second integrated circuit.

Figure 10:
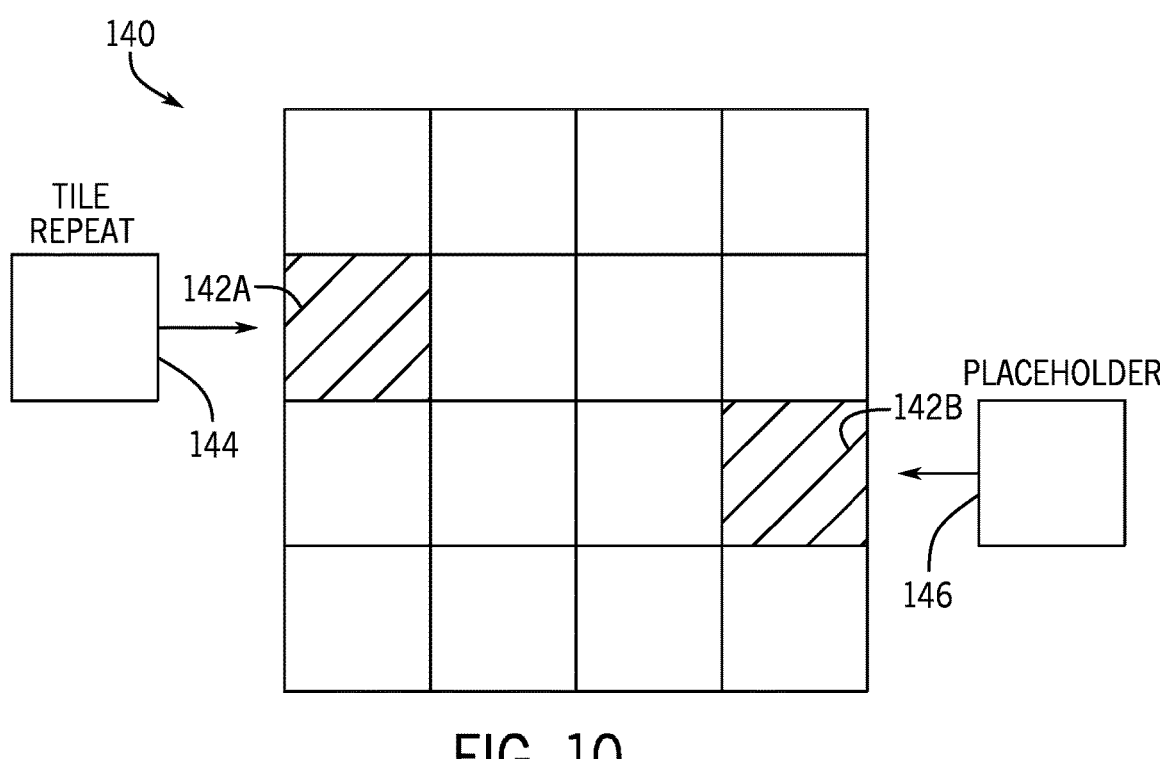
FIG. 10 is an illustration of the error concealment performed on an image frame split into sub-frames.

With the foregoing in mind, FIG. 10 is an illustration of the error concealment performed on an image frame 140, which may be split into tiles (e.g., the frames, the subframes, the strips). As illustrated, the image frame may have multiple missing tiles (and thus errors), such as missing tile 142A and/or missing tile 142B. Where there are missing tiles (142A and/or 142B), error concealment is performed. In an embodiment, the consumer 72 may repeat a previous tile 144 where the rendering of the image data is late or when the sync-triggered stream is unavailable.

In another embodiment, the missing tile 142B may be concealed with the insertion of a placeholder tile 146 by the consumer 72. The placeholder tile 146 may include the glyph value, which may include a gray value, a green value, a black value, or the like. It should be noted that although the image frame 140 of FIG. 10 is illustrated as being split into 16 tiles, the image frame 40 may be split into any suitable number of tiles. Further, although the missing tiles (142A and 142B) are illustrated, any suitable number of tiles may be missing from the image frame 140.

In this manner, the techniques described herein may facilitate a reduction in visual artifacts that could appear in the display(s) 18 to a viewer. As such, the appearance of image artifacts on the display(s) 18 viewed by a user may be reduced, and the user experience through the implementation of error concealment. That is, the user experience may be improved by replacing or repeating missing tiles on the display(s) 18 for visualization by the viewer.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. First integrated circuitry comprising:
image data rendering circuitry configured to generate image data; and memory configured to store a dashboard comprising dashboard entries indicating a stream status of the image data rendering circuitry, wherein the dashboard entries comprise a bit-value register, a bit-status register, or both, wherein the bit-value register comprises a first number of bits corresponding to a stream identification of the image data, and wherein the bit-status register comprises a second number of bits corresponding to a timestamp, a dropped bit, a new bit, one or more reserved bits, or any combination thereof, and wherein the image data rendering circuitry is configured to operate based at least in part on feedback associated with the stream status of the image data from the dashboard.

2. The first integrated circuitry of claim 1, wherein the image data rendering circuitry is configured to determine frame data availability associated with the image data via the dashboard.

3. The first integrated circuitry of claim 2, wherein the image data rendering circuitry is configured to update a dashboard entry of the dashboard entries, wherein the dashboard entry corresponds to the frame data availability, the image data, or both.

4. The first integrated circuitry of claim 1, comprising streaming encoding or decoding circuitry configured to transmit the image data.

5. The first integrated circuitry of claim 4, wherein firmware associated with the streaming encoding or decoding circuitry is configured to update the dashboard entries based on the stream status of the image data indicating whether one of a plurality of streams of the image data has been fully received by the streaming encoding or decoding circuitry.

6. The first integrated circuitry of claim 1, wherein a dashboard entry of the dashboard entries is configured to be read by the first integrated circuitry to enable adjustment of generation or transmission of future image data.

7. The first integrated circuitry of claim 1, wherein the dashboard comprises a table, and wherein the table comprises the dashboard entries for each of one or more frames of a stream of image data that is transmitted.

8. The first integrated circuitry of claim 1, wherein each of the dashboard entries comprises a stream identification (ID), a frame of one or more frames of the image data, the timestamp, the dropped bit, the new bit, the one or more reserved bits, or any combination thereof.

9. The first integrated circuitry of claim 1, wherein the first integrated circuitry is configured to generate replacement image data in response to determining at least one of one or more frames of the image data is a partial frame or a missing frame based on the stream status.

10. The first integrated circuitry of claim 9, wherein generating the replacement image data comprises inserting one or more glyphs, previously received image data from one or more previous frames, or any combination thereof.

11. The first integrated circuitry of claim 1, wherein the image data rendering circuitry is configured to determine whether the image data is erroneous or missing based on the stream status.

12. An integrated circuit comprising:
streaming encoding or decoding circuitry configured to:
receive image data;
transport the image data; and
update a dedicated dashboard entry of one or more dedicated dashboard entries in a dashboard readable by other circuitry of the integrated circuit that provides a stream status of the image data and data availability corresponding to the image data, wherein the one or more dedicated dashboard entries comprise a bit-value register, a bit-status register, or both, wherein the bit-value register comprises a first number of bits corresponding to a stream identification of the image data, and wherein the bit-status register comprises a second number of bits corresponding to a timestamp, a dropped bit, a new bit, one or more reserved bits, or any combination thereof.

13. The integrated circuit of claim 12, wherein the streaming encoding or decoding circuitry is configured to update the dedicated dashboard entry by writing data to the dedicated dashboard entry of the image data.

14. The integrated circuit of claim 12, wherein the dashboard comprises a table, and wherein the table comprises the one or more dedicated dashboard entries for each frame of one or more frames of the image data that is transmitted.

15. The integrated circuit of claim 12, wherein the integrated circuit is configured to adjust rendering of the image data based on the dashboard providing the stream status of the image data and the data availability corresponding to the image data.

16. An electronic device comprising:
an electronic display;
a first integrated circuit configured to:
    render image data;
    transport the image data; and
    maintain a dashboard readable by the first integrated circuit that provides an indication of a stream status of the image data for the transport, wherein the dashboard comprises dashboard entries comprising a bit-value register, a bit-status register, or both, wherein the bit-value register comprises a first number of bits corresponding to a stream identification of the image data, and wherein the bit-status register comprises a second number of bits corresponding to a timestamp, a dropped bit, a new bit, one or more reserved bits, or any combination thereof; and
    a second integrated circuit configured to receive the image data from the first integrated circuit and display the image data on the electronic display.

17. The electronic device of claim 16, wherein the first integrated circuit is configured to update a dashboard entry of the dashboard to provide the stream identification, a frame, and the timestamp as the image data is rendered or transported.

18. The electronic device of claim 17, wherein the first integrated circuit is configured to receive a repeat of one or more frames of the image data for transmission based on the dashboard entry.

19. The electronic device of claim 18, wherein the repeated one or more frames of the image data comprise graphics data, matting data, metadata, meshes data, gaze dependent compensation data for a left camera, a right camera, or both, or any combination thereof.

* * * * *